US012459147B2

(12) United States Patent
Iga et al.

(10) Patent No.: US 12,459,147 B2
(45) Date of Patent: Nov. 4, 2025

(54) CUTTING APPARATUS

(71) Applicant: DISCO CORPORATION, Tokyo (JP)

(72) Inventors: Hayato Iga, Tokyo (JP); Yuichi Kitazumi, Tokyo (JP); Kwangyoung Jung, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 173 days.

(21) Appl. No.: 18/500,678

(22) Filed: Nov. 2, 2023

(65) Prior Publication Data

US 2024/0165842 A1 May 23, 2024

(30) Foreign Application Priority Data

Nov. 17, 2022 (JP) ................................. 2022-183902

(51) Int. Cl.
*B26D 5/00* (2006.01)
*B26D 1/04* (2006.01)

(52) U.S. Cl.
CPC ................ *B26D 5/007* (2013.01); *B26D 1/04* (2013.01)

(58) Field of Classification Search
CPC ............... Y10T 83/141; Y10T 83/2066; Y10T 83/8857; Y10T 83/8858; B26D 5/007; B26D 1/04; B26D 1/14; B26D 7/088; B26D 7/1854; B26D 7/1863; H01L 21/67092; H01L 21/67034; B08B 3/02; B08B 5/02; B28D 5/0058; B28D 5/0064; B28D 5/022; B28D 5/0082; B24B 49/12; B24B 55/02
See application file for complete search history.

(56) References Cited

FOREIGN PATENT DOCUMENTS

| | | |
|---|---|---|
| JP | 2007088361 A | 4/2007 |
| JP | 2010027968 A * | 2/2010 |

* cited by examiner

*Primary Examiner* — Phong H Nguyen
(74) *Attorney, Agent, or Firm* — GREER BURNS & CRAIN, LTD.

(57) ABSTRACT

An image capturing unit includes a camera, an assembled lens that is connected to the camera and that magnifies a region to be imaged, a cover lens that covers an objective lens of the assembled lens, a fluid spray nozzle that sprays a fluid including water to the cover lens, a fluid removing nozzle that blows air to the cover lens to remove the fluid deposited on the cover lens, and a cutting water removing nozzle that blows air to a wafer positioned at a position directly under the cover lens, to remove cutting water stagnating on an upper surface of the wafer.

4 Claims, 4 Drawing Sheets

CUTTING APPARATUS

BACKGROUND OF THE INVENTION

Field of the Invention

The present invention relates to a cutting apparatus for cutting a wafer.

Description of the Related Art

A wafer having a plurality of devices such as integrated circuits (ICs) and large-scale integrated (LSI) circuits formed on a front surface thereof partitioned by a plurality of intersecting division lines is divided into individual device chips by a cutting apparatus, and the device chips thus divided are used for electric apparatuses such as mobile phones and personal computers.

The cutting apparatus includes a chuck table that holds the wafer, a cutting unit that includes, in a rotatable manner, a cutting blade for cutting the wafer held by the chuck table while supplying cutting water, an image capturing unit that is disposed adjacent to the cutting unit and captures an image of the wafer held by the chuck table to detect a region to be cut, and a processing feeding mechanism that performs processing feeding of the chuck table. The cutting apparatus thus configured is capable of dividing the wafer into the individual device chips with high accuracy (see, for example, Japanese Patent Laid-open No. 2007-088361).

SUMMARY OF THE INVENTION

The cutting apparatus described in Japanese Patent Laid-open No. 2007-088361 includes a mechanism for covering an objective lens constituting the image capturing unit, so as to prevent swarf generated during the cutting from being deposited on the objective lens. The mechanism includes a slide plate disposed adjacent to the objective lens. The slide plate is slid and moved to a retreat position to expose the objective lens when an image of the wafer is to be captured, and is slid and moved to an operating position to shield the objective lens from the outside when the wafer is to cut.

However, with the mechanism for sliding the slide plate to open and close the space on the objective lens, a slight gap is present between the slide plate and a guide that supports the slide plate, and also between the slide plate and the objective lens, so that cutting water in a mist form may enter through the gaps, resulting in contamination of the objective lens. Therefore, the slide plate and the objective lens need to be cleaned on a regular basis.

In addition, there is a problem that, when an image of the wafer is captured by the image capturing unit, cutting water deposited on the slide plate and the guide may drip onto an upper surface of the wafer, hampering normal image capturing and lowering the quality of image capturing.

Accordingly, it is an object of the present invention is to provide a cutting apparatus that can prevent contamination of an objective lens of an image capturing unit with cutting water and also prevent such a situation that image capturing by the image capturing unit is hampered by the cutting water.

In accordance with an aspect of the present invention, there is provided a cutting apparatus including a chuck table that holds a wafer, a cutting unit that includes, in a rotatable manner, a cutting blade for cutting the wafer held by the chuck table while supplying water, an image capturing unit that is disposed adjacent to the cutting unit and that captures an image of the wafer held by the chuck table, to detect a region to be cut, and a processing feeding mechanism that performs processing feeding of the wafer. The image capturing unit includes a camera, an assembled lens that is connected to the camera and that magnifies a region to be imaged, a cover lens that covers an objective lens of the assembled lens, a fluid spray nozzle that sprays a fluid including water to the cover lens, a fluid removing nozzle that blows air to the cover lens to remove the fluid deposited on the cover lens, and a cutting water removing nozzle that blows air to the wafer positioned at a position directly under the cover lens, to remove cutting water stagnating on an upper surface of the wafer.

Preferably, the cover lens has a surface having been subjected to a water repellent treatment. One nozzle may function as both the fluid spray nozzle and the fluid removing nozzle. Preferably, an extension lens that widens a distance between the cover lens and the wafer is disposed adjacent to the camera between the assembled lens and the camera.

According to the present invention, there are prevented a situation in which the contaminated objective lens degrades the quality of the image of the wafer captured by the image capturing unit, and a situation in which the cutting water drips from the image capturing unit onto the region to be imaged and the region is thus contaminated. In addition, when the state of the cut grooves is checked by the image capturing unit, the cutting water is efficiently removed from the region to be imaged, by air blown from the cutting water removing nozzle.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
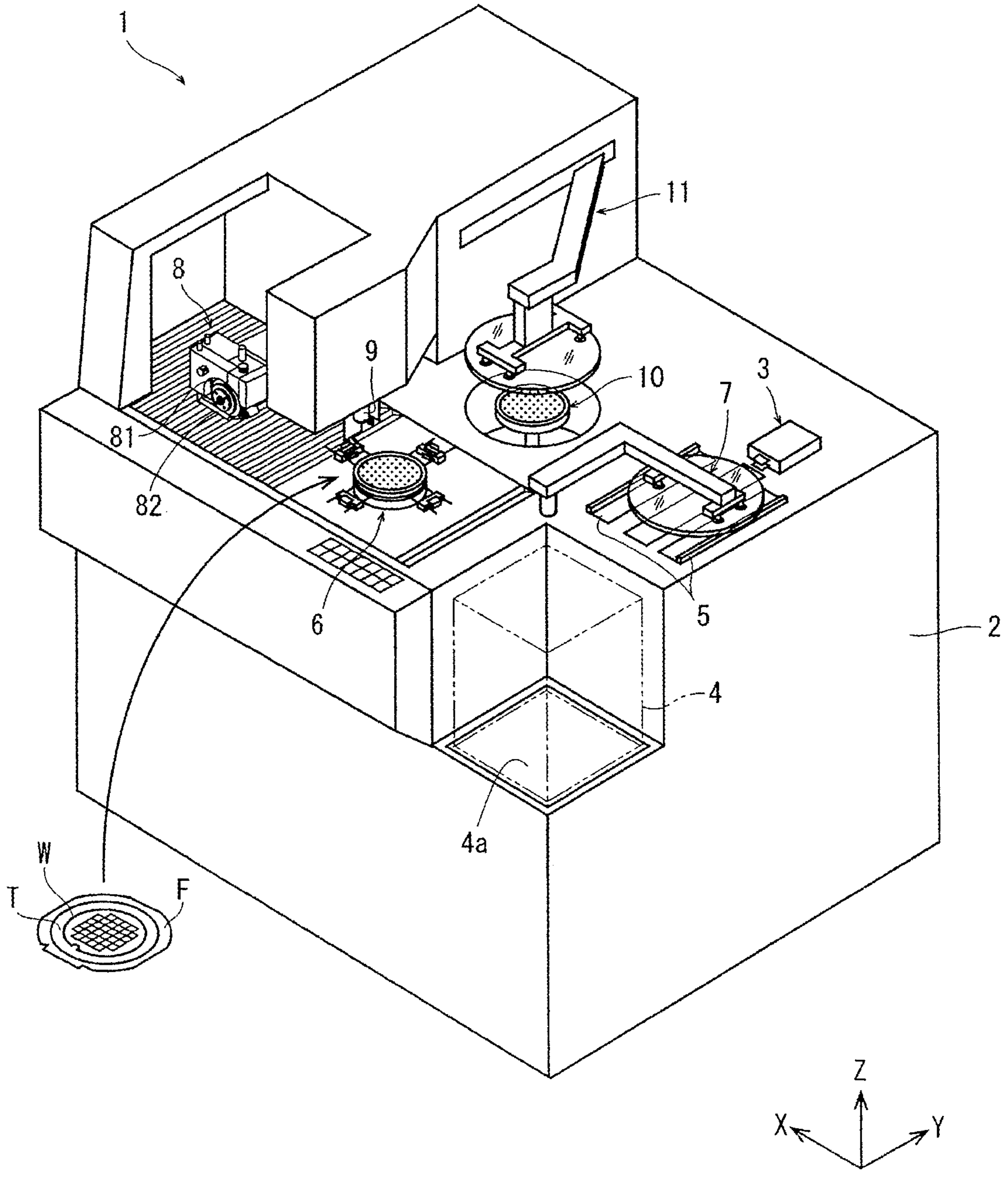
FIG. 1 is an overall perspective view of a cutting apparatus.

A cutting apparatus according to an embodiment of the present invention will be described in detail below with reference to the attached drawings. FIG. 1 is an overall perspective view of a cutting apparatus 1 according to the present embodiment. A workpiece to be processed by the illustrated cutting apparatus 1 is a semiconductor wafer W. The wafer W has a plurality of devices formed on a front surface thereof partitioned by a plurality of intersecting division lines, and is supported by an annular frame F through a pressure sensitive adhesive tape T.

The cutting apparatus 1 includes a chuck table 6 that holds the wafer W, a cutting unit 8 that includes, in a rotatable manner, a cutting blade 81 for cutting the wafer W held by the chuck table 6 while supplying cutting water, an image capturing unit 9 that is disposed adjacent to the cutting unit 8 in an X-axis direction and that captures an image of the wafer W held by the chuck table 6 to detect a region (division line) to be cut, and a processing feeding mechanism (formed in an apparatus housing 2 and not illustrated) that performs processing feeding of the chuck table 6.

The cutting apparatus 1 further includes a cassette 4 placed on a cassette table 4*a* in the apparatus housing 2, a carrying-in/out mechanism 3 that carries out an unprocessed wafer W supported by the annular frame F from the cassette 4 onto a temporary placing table 5, a delivery mechanism 7 that has a slewing arm for delivering the wafer W carried out onto the temporary placing table 5 to the chuck table 6, and a cleaning carrying-out mechanism 11 that delivers the wafer W from a carrying-in/out position where the chuck table 6 is positioned in FIG. 1, to a cleaning unit 10 (the details thereof is omitted). The cutting apparatus 1 is provided with a controller, a display unit, and the like, which are omitted from illustration.

The cutting unit 8 includes a cutting water supply nozzle 82 that supplies cutting water to a cutting region where the wafer W held by the chuck table 6 is cut by the cutting blade 81. The cutting unit 8 includes an X-axis feeding mechanism (processing feeding mechanism) that is disposed in the apparatus housing 2 and that moves the cutting unit 8 in the X-axis direction indicated by an arrow X in the figure, a Y-axis feeding mechanism that moves the cutting unit 8 in a Y-axis direction indicated by an arrow Y in the figure, and a Z-axis feeding mechanism that moves the cutting unit 8 in a Z-axis direction indicated by an arrow Z in the figure (which are omitted from illustration).

When the wafer W is to be cut by the above-described cutting apparatus 1, first, the wafer W is carried out from the cassette 4 onto the temporary placing table 5 by the carrying-in/out mechanism 3, delivered to and placed on the chuck table 6 by the delivery mechanism 7, and held under suction on the chuck table 6. Then, the above-mentioned processing feeding mechanism is operated to position the wafer W at a position directly under the image capturing unit 9. The image capturing unit 9 captures an image of the wafer W, and a predetermined region of the wafer W which is to be cut is detected on the basis of the captured image to match the region to the X-axis direction and align the region with the cutting blade 81.

Here, when a cut groove is to be formed in the wafer W by the above-mentioned cutting blade 81, cutting water is supplied from the cutting water supply nozzle 82. At this time, the cutting water thus supplied may be wound up, swarf (contaminants) may be scattered, and the cutting water in a mist form may stagnate in the surroundings of the image capturing unit 9, so that the image capturing unit 9 may be contaminated. To cope with such a problem, the image capturing unit 9 according to the present embodiment has the following configuration.

Figure 2:
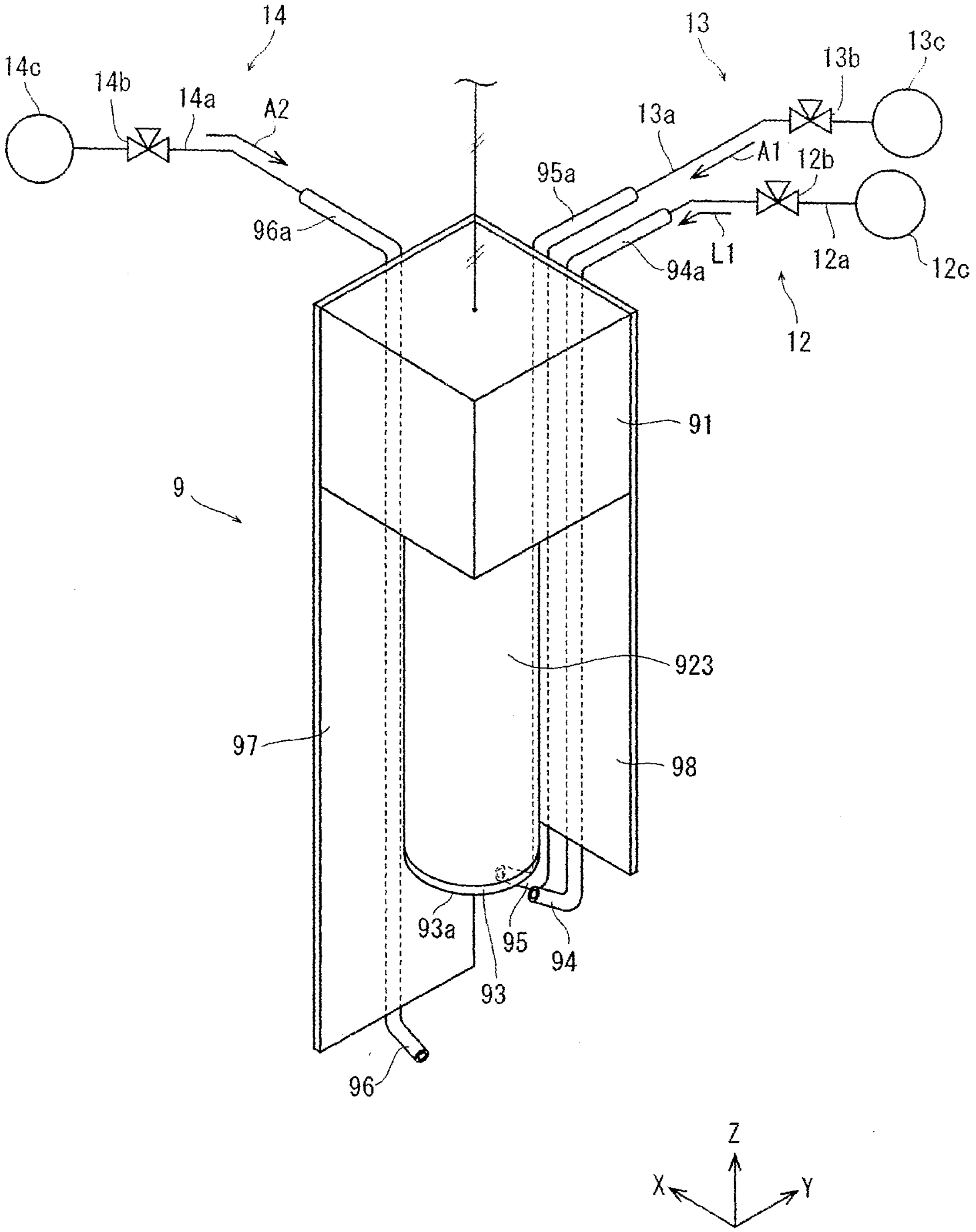
FIG. 2 is a perspective view of an image capturing unit which is mounted on the cutting apparatus depicted in FIG. 1.
Figure 3:
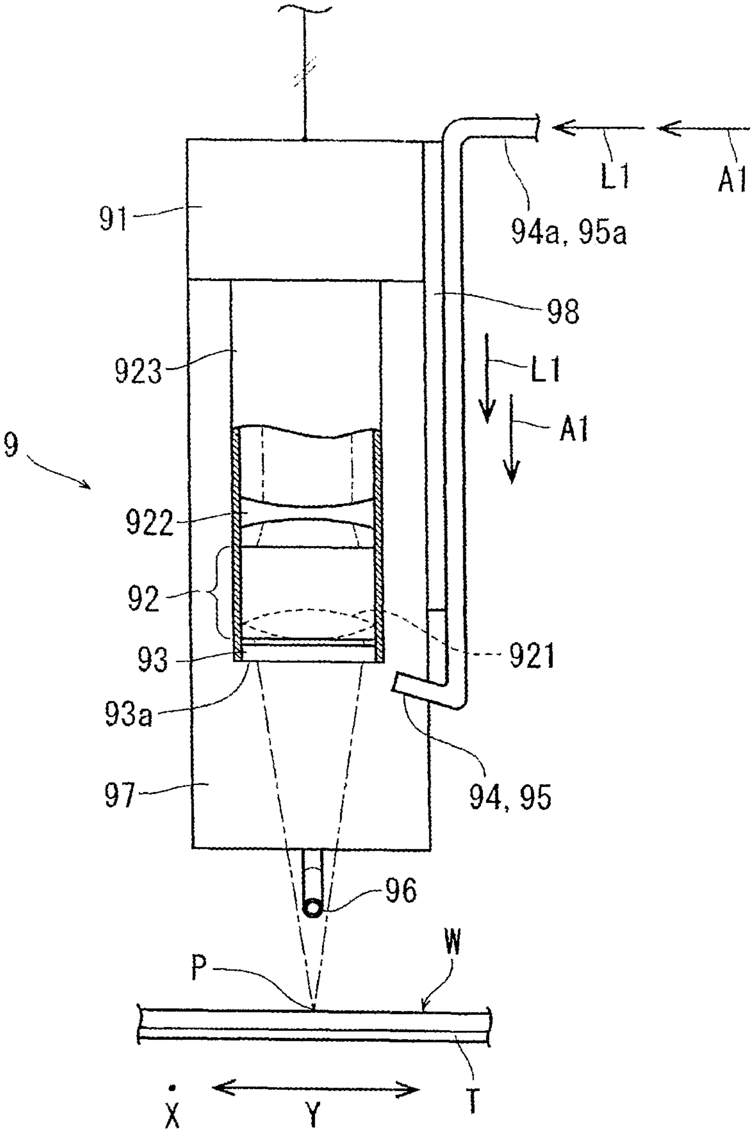
FIG. 3 is a side view, partly in cross section, of the image capturing unit depicted in FIG. 2 and depicts an internal configuration of the image capturing unit.

FIGS. 2 and 3 depict the image capturing unit 9 mounted on the above-described cutting apparatus 1. The image capturing unit 9 includes a camera 91 connected to the unillustrated controller, an assembled lens 92 (see FIG. 3) that is connected to the camera 91 and that magnifies a region to be imaged, and a cover lens 93 that covers an objective lens 921 of the assembled lens 92 which is located on the most lower end side. The cover lens 93 is a glass plate member and is mounted to hermetically close the lower end side of a lens-barrel 923 that accommodates the assembled lens 92. Note that, in FIG. 3, for convenience' sake, the lens-barrel 923 is depicted with a part thereof cut out, and the details of the assembled lens 92 are omitted.

The image capturing unit 9 includes a fluid spray nozzle 94 that sprays a fluid L1 including water to the cover lens 93, a fluid removing nozzle 95 that blows air A1 to the cover lens 93 to remove the fluid L1 deposited on the cover lens 93, and a cutting water removing nozzle 96 that blows air A2 to the region to be imaged of the wafer W positioned at a position directly under the cover lens 93, to remove the cutting water stagnating on an upper surface of the wafer W. In addition, in the present embodiment, the cover lens 93 has a lower surface, i.e., a surface 93*a*, that has been subjected to a water repellent treatment, for example, fluorine-based or silicone-based coating.

The image capturing unit 9 has a first cover plate 97 disposed on the side of the cutting unit 8 in the X-axis direction and a second cover plate 98 disposed on the side of the cleaning unit 10 in the Y-axis direction. As illustrated, the cutting water removing nozzle 96 is mounted on the first cover plate 97, whereas the fluid spray nozzle 94 and the fluid removing nozzle 95 are mounted on the second cover plate 98. In the present embodiment, only the first cover plate 97 and the second cover plate 98 are disposed on the side of the cutting unit 8 in the X-axis direction and on the side of the cleaning unit 10 in the Y-axis direction, respectively. However, in addition to the first cover plate 97 and the second cover plate 98, similar cover plates may also be disposed on the sides facing the first cover plate 97 and the second cover plate 98, so as to surround the four sides of the image capturing unit 9.

As illustrated in FIG. 2, a cleaning fluid supply unit 12 is connected to an introduction port 94*a* of the fluid spray nozzle 94. The cleaning fluid supply unit 12 includes a first route 12*a*, an on-off valve 12*b* disposed on the first route 12*a*, and a cleaning fluid supply source 12*c* that supplies the fluid L1. The cleaning fluid supply unit 12 is means that causes the cleaning fluid supply source 12*c* to raise the pressure of the fluid L1 including water (pure water) for cleaning the cover lens 93 and supply the fluid L1 through the first route 12*a*, and the on-off valve 12*b* is controlled in its opening and closing by the unillustrated controller. In addition, a first air supply unit 13 is connected to an introduction port 95*a* of the fluid removing nozzle 95. The first air supply unit 13 includes a second route 13*a*, an on-off valve 13*b* disposed on the second route 13*a*, and a first air supply source 13*c*. The first air supply unit 13 is means that causes the first air supply source 13*c* to raise the pressure of the air A1 and supply the air A1 through the second route 13*a* in order to remove the fluid L1 deposited on the cover lens 93, and the on-off valve 13*b* is controlled in its opening and closing by the unillustrated controller. Further, a second air supply unit 14 is connected to an introduction port 96*a* of the cutting water removing nozzle 96. The second air supply unit 14 includes a third route 14*a*, an on-off valve 14*b* disposed on the third route 14*a*, and a second air supply source 14*c*. The second air supply unit 14 is means that causes the second air supply source 14*c* to raise the pressure of the air A2 and supply the air A2 through the third route 14*a* in order to remove the cutting water present on the wafer W, and the on-off valve 14*b* is controlled in its opening and closing by the unillustrated controller. Note that a single air supply source may function as both the first air supply source 13*c* of the first air supply unit 13 and the second air supply source 14*c* of the second air supply unit 14.

In an optical system disposed inside the lens-barrel 923 in the present embodiment, an extension lens 922 that widens the focal distance between the objective lens 921 and a focal point P on the wafer W is disposed adjacent to the camera 91 between the above-mentioned assembled lens 92 and the camera 91. The extension lens 922 includes, for example, a concave lens. As understood from FIG. 3, the position of the focal point P formed by the objective lens 921 with the extension lens 922 is lower (for example, a position spaced by 90 mm to the lower side from the objective lens 921) than the position of the focal point P formed by the objective lens 921 without the extension lens 922 (for example, a position spaced by 19 mm to the lower side from the objective lens 921).

The cutting apparatus 1 according to the present embodiment is generally configured as described above, and the function and operation of the cutting apparatus 1 will be described below.

When the cutting unit 8 of the cutting apparatus 1 described on the basis of FIG. 1 is to cut the wafer W, first, the wafer W accommodated in the cassette 4 is carried out onto the temporary placing table 5 by the carrying-in/out mechanism 3 and is delivered by the delivery mechanism 7 onto the chuck table 6 located at the carrying-in/out position in FIG. 1. After the wafer W is placed on and held under suction by the chuck table 6, the wafer W is positioned at a position directly under the image capturing unit 9 by the above-mentioned processing feeding mechanism, and an image of the wafer W is captured in order to detect the region of the wafer W which is to be cut.

Figure 4:
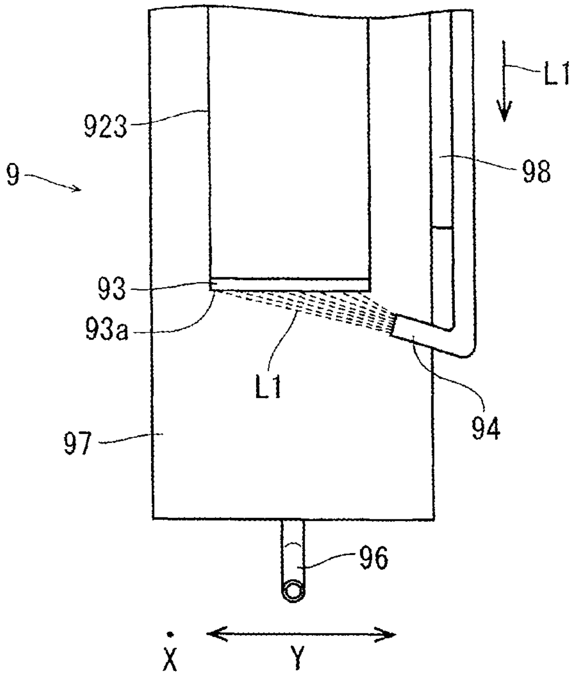
FIG. 4 is a side view depicting the manner in which a fluid is sprayed by a fluid spray nozzle.

Here, before the wafer W is moved to the position directly under the above-mentioned image capturing unit 9 to capture the image, cleaning of the cover lens 93 and removal of the fluid deposited on the surface 93*a* of the cover lens 93 are performed. The cover lens 93 is cleaned by opening the on-off valve 12*b* on the above-mentioned first route 12*a* and operating the cleaning fluid supply source 12*c* to supply the fluid L1 (for example, pure water) into the first route 12*a*. As depicted in FIG. 4, the fluid L1 supplied into the first route 12*a* is sprayed from the fluid spray nozzle 94 toward the surface 93*a* of the cover lens 93 that hermetically closes the lens-barrel 923 of the image capturing unit 9. As a result, even if a mist of the cutting water or swarf is going to deposit on the surface 93*a* of the cover lens 93, it is washed away by the fluid L1. As has been described above, the cover lens 93 is hermetically closing the lower end side of the lens-barrel 923 accommodating the assembled lens 92. Hence, even when the fluid L1 is jetted, the fluid L1 does not enter into the lens-barrel 923, and contamination of the inside of the lens-barrel 923 or the assembled lens 92 would not occur. In addition, since the surface 93*a* of the cover lens 93 has been subjected to the water repellent treatment, the surface 93*a* is excellent in draining properties for the fluid L1, and deposition of the cutting water and the swarf is restrained.

The cleaning of the cover lens 93 by the cleaning fluid supply unit 12 is continuously performed while the cutting to be described later is conducted, but is stopped in a state in which the cutting is not conducted. When the cleaning fluid supply unit 12 is stopped, the first air supply unit 13 is operated such that the fluid L1 deposited on the surface 93*a* of the cover lens 93 is removed and that the mist of cutting water generated by the cutting is not deposited on the surface 93*a* of the cover lens 93. More specifically, the above-mentioned on-off valve 13*b* on the second route 13*a* is opened, and the first air supply source 13*c* is operated to supply the high-pressure air A1 into the second route 13*a*. As understood from FIG. 2, the air A1 supplied from the second route 13*a* to the introduction port 95*a* is blown to the surface 93*a* of the cover lens 93 from the tip of the fluid removing nozzle 95 facing the lower surface 93*a* of the cover lens 93. As a result, the fluid L1 deposited on the cover lens 93 is blown off, the surface 93*a* of the cover lens 93 comes into a dried state, and deposition of a new mist of the cutting water is prevented. The blowing of the air A1 from the fluid removing nozzle 95 is continuously performed while not only the image capturing unit 9 is operating but also the cutting is not conducted, whereby the drying of the surface 93*a* of the cover lens 93 is maintained.

As described above, with the surface 93*a* of the cover lens 93 dried, the wafer W held by the chuck table 6 is moved to the position directly under the image capturing unit 9 to capture an image of the wafer W, and a predetermined division line of the wafer W that is the region to be cut is detected on the basis of the captured image. In this instance, since the surface 93*a* of the cover lens 93 is kept in a clean dried state, there are prevented a situation in which the contaminated objective lens 921 of the assembled lens 92 degrades the quality of the image of the wafer W captured by the image capturing unit 9, and a situation in which the cutting water drips from the image capturing unit 9 onto the region to be imaged and the region is thus contaminated.

Next, a division line at which to start the cutting is aligned with the cutting blade 81 of the cutting unit 8, the cutting unit 8 is positioned at a processing start position of a predetermined division line extending in a first direction, and the cutting blade 81 of the cutting unit 8 is rotated at a high speed. Next, cutting water is supplied from the cutting water supply nozzle 82, and the cutting blade 81 is made to cut into the division line in the Z-axis direction from the surface of the wafer W. At the same time, the above-mentioned processing feeding mechanism is operated to form a cut groove 100 in the wafer W (see also FIG. 5). Then, the above-mentioned processing feeding mechanism, the Y-axis feeding mechanism, and the Z-axis feeding mechanism as well as a rotational drive mechanism for rotating the chuck table 6 are operated to form the cut grooves 100 in the wafer W along all the division lines to be cut.

As described above, while the cutting is performed, the cleaning fluid supply unit 12 is operated to spray the fluid L1 to the surface 93*a* of the cover lens 93 of the image capturing unit 9 from the fluid spray nozzle 94. Hence, even if a mist including the swarf generated during the cutting is scattered to the surrounding region of the image capturing unit 9, deposition of the mist on the cover lens 93 of the image capturing unit 9 is prevented.

When the above-described cutting has been completed, the state of the cut grooves 100 formed by the cutting is checked as required. When the cutting is completed or the cutting is interrupted to check the state of the cut grooves 100, the above-mentioned cleaning fluid supply unit 12 is stopped, and the first air supply unit 13 is operated to start the supply of the high-pressure air A1 to the surface 93*a* of the cover lens 93. As a result, the fluid L1 deposited on the cover lens 93 is blown away and removed, and the surface 93*a* of the cover lens 93 is maintained in a clean dried state.

Figure 5:
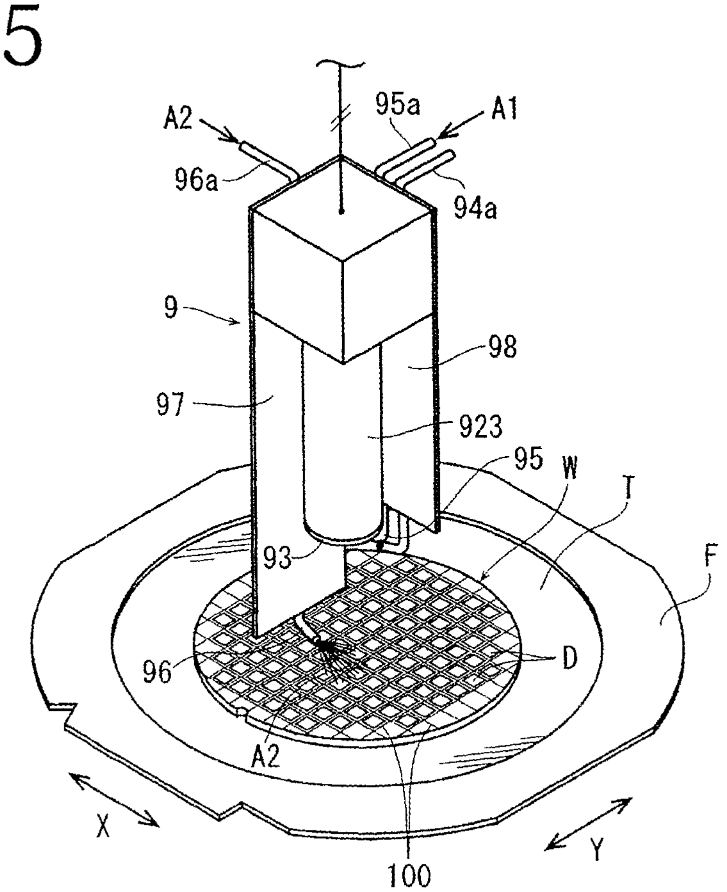
FIG. 5 is a perspective view depicting the manner in which air is blown by a cutting water removing nozzle to a region of a wafer to be imaged.

When the state of the cut grooves 100 is to be checked, the wafer W is moved together with the chuck table 6, and a predetermined region of the cut grooves 100 to be checked is positioned at a position directly under the image capturing unit 9. Next, the above-mentioned second air supply unit 14 is operated to introduce the air A2 into the introduction port 96*a* of the cutting water removing nozzle 96. As a result, as depicted in FIG. 5, the air A2 is blown from the cutting water removing nozzle 96 toward the region of the cut grooves 100 in the wafer W to be checked and to be imaged, whereby the cutting water, the swarf, and the like stagnating upon the cutting are removed from the region to be imaged. Note that, also while the wafer W is moved to a position directly under the image capturing unit 9 and the air A2 is blown from the cutting water removing nozzle 96 toward the region of the wafer W to be imaged, the operation of blowing the air A1 to the surface 93*a* of the cover lens 93 from the tip of the fluid removing nozzle 95 facing the lower surface 93*a* of the cover lens 93 is continuously performed. In this way, the cutting water and the swarf removed from the upper surface of the wafer W and then scattered are prevented from being deposited on the surface 93*a* of the cover lens 93 of the image capturing unit 9 again and do not hamper the image capturing. Note that, in the image capturing unit 9 in the present embodiment, the extension lens 922 that widens the focal distance between the objective lens 921 and the focal point P on the wafer W is disposed adjacent to the camera 91 between the assembled lens 92 and the camera 91, so that the wafer W and the optical system of the image capturing unit 9 can be positioned with a sufficient distance therebetween. Thus, contamination of the cover lens 93 of the image capturing unit 9 is restrained.

As described above, in the state in which the cutting water is removed from the region of the wafer W to be imaged and the cover lens 93 of the image capturing unit 9 is cleaned and dried, the image capturing unit 9 captures images of the cut grooves 100 to check the state of the cut grooves 100 cut by the cutting unit 8. In such a manner, the state upon processing by the cutting blade 81 is checked, and the results of the checking are used to determine when to replace the cutting blade 81, for example.

In the case where the cutting has been completed, after the state of the cut grooves 100 is checked as described above, the chuck table 6 is moved to the carrying-in/out position depicted in FIG. 1, and the wafer W is delivered to the cleaning unit 10 by the cleaning carrying-out mechanism 11 so as to be cleaned and dried and is then accommodated in the cassette 4 by operating the delivery mechanism 7 and the carrying-in/out mechanism 3. In the case where the cutting has been interrupted to check the cut grooves 100, on the other hand, after the state of the cut grooves 100 is checked, the cutting by the cutting unit 8 is again started.

In the above-described embodiment, the fluid spray nozzle 94 and the fluid removing nozzle 95 are separately configured, but the present invention is not limited to this configuration. As depicted in FIG. 3, the fluid spray nozzle 94 and the fluid removing nozzle 95 may be configured as a single nozzle, i.e., a fluid spray and removing nozzle (94, 95). In the case where the fluid spray nozzle 94 and the fluid removing nozzle 95 are configured as the fluid spray and removing nozzle (94, 95), for example, when the fluid L1 is supplied to the surface 93*a* of the cover lens 93 from the fluid spray and removing nozzle (94, 95), the fluid spray and removing nozzle (94, 95) may also be supplied with the air A1 from the first air supply unit 13 to supply two fluids (fluid L1+air A1) therefrom, that is, may function as a two-fluid spray nozzle. With the two fluids sprayed from the fluid spray and removing nozzle, the cleaning power to clean the surface 93*a* of the cover lens 93 is enhanced, and deposition of the swarf (contaminants) on the surface 93*a* of the cover lens 93 is prevented more securely.

In addition, to supply the two fluids (fluid L1+air A1) to the surface 93*a* of the cover lens 93, the fluid spray nozzle 94 and the fluid removing nozzle 95 do not necessarily need to be configured as a single nozzle, i.e., the fluid spray and removing nozzle (94, 95), as described above. For example, a bypass channel branching from the second route 13*a* of the first air supply unit 13 depicted in FIG. 2 to the first route 12*a* of the cleaning fluid supply unit 12 may be disposed, an on-off valve may be provided on the bypass channel, and the air A1 may be introduced into the first route 12*a* from the first air supply unit 13, whereby the two fluids (fluid L1+air A1) can be sprayed from the fluid spray nozzle 94.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus comprising:

a chuck table that holds a wafer;

a cutting unit that includes, in a rotatable manner, a cutting blade for cutting the wafer held by the chuck table while supplying water;

an image capturing unit that is disposed adjacent to the cutting unit and that captures an image of the wafer held by the chuck table, to detect a region to be cut; and a processing feeding mechanism that performs processing feeding of the wafer, wherein the image capturing unit includes a camera, an assembled lens that is connected to the camera and that magnifies a region to be imaged, a cover lens that covers an objective lens of the assembled lens, a fluid spray nozzle that sprays a fluid including water to the cover lens, a fluid removing nozzle that blows air to the cover lens to remove the fluid deposited on the cover lens, and a cutting water removing nozzle that blows air to the wafer positioned at a position directly under the cover lens, to remove cutting water stagnating on an upper surface of the wafer.

2. The cutting apparatus according to claim 1, wherein the cover lens has a surface having been subjected to a water repellent treatment.

3. The cutting apparatus according to claim 1, wherein one nozzle functions as both the fluid spray nozzle and the fluid removing nozzle.

4. The cutting apparatus according to claim 1, wherein an extension lens that widens a distance between the cover lens and the wafer is disposed adjacent to the camera between the assembled lens and the camera.

* * * * *